United States Patent
Ito et al.

(10) Patent No.: US 8,899,397 B2
(45) Date of Patent: Dec. 2, 2014

(54) CLUTCH CONTROL SYSTEM OF CLUTCH APPARATUS FOR HYBRID VEHICLE

(71) Applicant: Aisin Seiki Kabushiki Kaisha, Kariya-shi (JP)

(72) Inventors: Shinichi Ito, Anjo (JP); Minoru Ikeda, Nagoya (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 14/025,169

(22) Filed: Sep. 12, 2013

(65) Prior Publication Data

US 2014/0083811 A1    Mar. 27, 2014

(30) Foreign Application Priority Data

Sep. 24, 2012  (JP) ................................. 2012-209099

(51) Int. Cl.
| | | |
|---|---|---|
| *F16D 25/0638* | (2006.01) | |
| *F16D 25/12* | (2006.01) | |
| *F16D 48/02* | (2006.01) | |

(52) U.S. Cl.
CPC ............ *F16D 25/14* (2013.01); *Y02T 10/6221* (2013.01)
USPC .................. 192/85.25; 192/85.37; 192/85.61; 192/85.63

(58) Field of Classification Search
USPC ....................... 192/85.25, 106 F, 85.37, 85.63
See application file for complete search history.

(56) References Cited

U.S. PATENT DOCUMENTS

| | | | |
|---|---|---|---|
| 5,281,190 A * | 1/1994 | Koivunen ...................... 475/116 |
| 2012/0103751 A1 | 5/2012 | Ikeda et al. | |
| 2012/0118695 A1* | 5/2012 | Kawashima et al. .... 192/48.609 |
| 2012/0193187 A1 | 8/2012 | Osawa et al. | |
| 2012/0318630 A1 | 12/2012 | Iwase et al. | |
| 2012/0319514 A1 | 12/2012 | Iwase et al. | |

FOREIGN PATENT DOCUMENTS

WO    WO 2011/062191 A1    5/2011

\* cited by examiner

*Primary Examiner* — Troy Chambers
*Assistant Examiner* — Lillian Nguyen
(74) *Attorney, Agent, or Firm* — Oblon, Spivak, McClelland, Maier & Neustadt, L.L.P.

(57) ABSTRACT

A clutch control system of a clutch apparatus for a vehicle, includes a regulator valve switchable between a first mode in which a fluid pressure of a hydraulic fluid to a pressurized chamber is regulated to a first predetermined fluid pressure and a second mode in which the fluid pressure to a canceller chamber is regulated to a second predetermined fluid pressure, the regulator valve discharging a portion of the hydraulic fluid as a drain lubricant to the clutch portion, a switching valve switchable between a supply mode in which the hydraulic fluid is supplied to the pressurized chamber and a discharge mode in which the pressurized chamber is connected to a reservoir, and a control valve controlling the regulator valve to be switched between the first mode and the second mode and controlling the switching valve to be switched between the supply mode and the discharge mode.

4 Claims, 3 Drawing Sheets

CLUTCH CONTROL SYSTEM OF CLUTCH APPARATUS FOR HYBRID VEHICLE

CROSS REFERENCE TO RELATED APPLICATIONS

This application is based on and claims priority under 35 U.S.C. §119 to Japanese Patent Application 2012-209099, filed on Sep. 24, 2012, the entire content of which is incorporated herein by reference.

TECHNICAL FIELD

This disclosure generally relates to a clutch control system of a clutch apparatus for a hybrid vehicle.

BACKGROUND DISCUSSION

WO2011/062191A, which will be hereinafter referred to as Reference 1, discloses a vehicle drive device including a clutch device that is arranged between an output shaft of an engine and an input shaft of a transmission for selectively connecting and disconnecting the output shaft and the input shaft to each other. The vehicle drive device disclosed in Reference 1 is switchable between a connected state in which the clutch device is engaged to transmit a driving force of the engine to the transmission and a disconnected state in which the engagement of the clutch device is released to interrupt the transmission of the driving force to the transmission. In the connected state, a piston member of the clutch device moves by a biasing force of an engagement spring to thereby bring a driving plate provided to face the output shaft of the engine and a driven plate provided to face the input shaft of the transmission in pressure contact with each other so that the driving plate and the driven plate engage with each other. In the disconnected state, an appropriate oil pressure is generated at a pressurized chamber by an operation of an electric hydraulic pump. Because of the aforementioned oil pressure, the piston member constituting the pressurized chamber moves against the biasing force of the engagement spring to release the engagement of the clutch device. In a case where the vehicle drive device is again shifted to the connected state, the pressurized chamber is disconnected from the electric hydraulic pump and is then connected to a reservoir. Then, an appropriate volume of hydraulic oil is supplied to a canceller chamber by the operation of the electric hydraulic pump so that a centrifugal oil pressure generated by oil that remains in the pressurized chamber is cancelled by a centrifugal oil pressure generated by the hydraulic oil at the canceller chamber. Consequently, the driving plate and the driven plate appropriately engage with each other by the biasing force of the engagement spring. In addition, in a case where the hydraulic oil is supplied to the pressurized chamber and the canceller chamber, the hydraulic oil partially diverges from an oil passage to be supplied to portions of the clutch device at which lubrication is necessary, for example, supplied to the driving plate, the driven plate, and a bearing portion.

According to the clutch device disclosed in Reference 1, for example, the hydraulic oil is supplied to the pressurized chamber and the canceller chamber by the electric hydraulic pump in required volume when necessary, thereby achieving a downsizing of the electric hydraulic pump. Nevertheless, the electric hydraulic pump that is downsized may have difficulty supplying a sufficient volume of lubricant simultaneously to the portions at which lubrication is necessary. In order to obtain a necessary volume of lubricant, the electric hydraulic pump may be enlarged.

A need thus exists for a clutch control system of a clutch apparatus for a hybrid vehicle which is not susceptible to the drawback mentioned above.

SUMMARY

According to an aspect of this disclosure, a clutch control system of a clutch apparatus for a hybrid vehicle, the clutch apparatus being a normally-closed type and including a clutch portion selectively connecting and disconnecting an input shaft that is rotatably connected to an engine and an output shaft that is rotatably connected to an electric motor, a compression spring biasing a piston member in a direction in which the clutch portion is connected, a pressurized chamber causing the piston member to move in a direction opposite from a biasing direction of the compression spring to disconnect the clutch portion in a state to be supplied with a hydraulic fluid including a predetermined pressure, and a canceller chamber generating a fluid pressure for cancelling a centrifugal fluid pressure that is generated at the hydraulic fluid remaining at the pressurized chamber by being supplied with a hydraulic fluid in a state where the clutch portion is connected, the clutch control system includes an electric oil pump supplying the hydraulic fluid to the pressurized chamber, the canceller chamber, and the clutch portion, a regulator valve being switchable between a first mode in which a fluid pressure of the hydraulic fluid supplied from a first output port to the pressurized chamber is regulated to a first predetermined fluid pressure and a second mode in which the fluid pressure of the hydraulic fluid supplied from a second output port to the canceller chamber is regulated to a second predetermined fluid pressure, the regulator valve discharging a portion of the hydraulic fluid at the first predetermined fluid pressure in the first mode or at the second predetermined fluid pressure in the second mode as a drain lubricant to be supplied to the clutch portion, a switching valve connected between the first output port and the pressurized chamber and being switchable between a supply mode in which the hydraulic fluid regulated to the first predetermined fluid pressure is supplied to the pressurized chamber and a discharge mode in which the pressurized chamber is connected to a reservoir, and a control valve connected to the electric oil pump, the regulator valve, the switching valve, and the canceller chamber, the control valve controlling the regulator valve to be switched between the first mode and the second mode and controlling the switching valve to be switched between the supply mode and the discharge mode.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
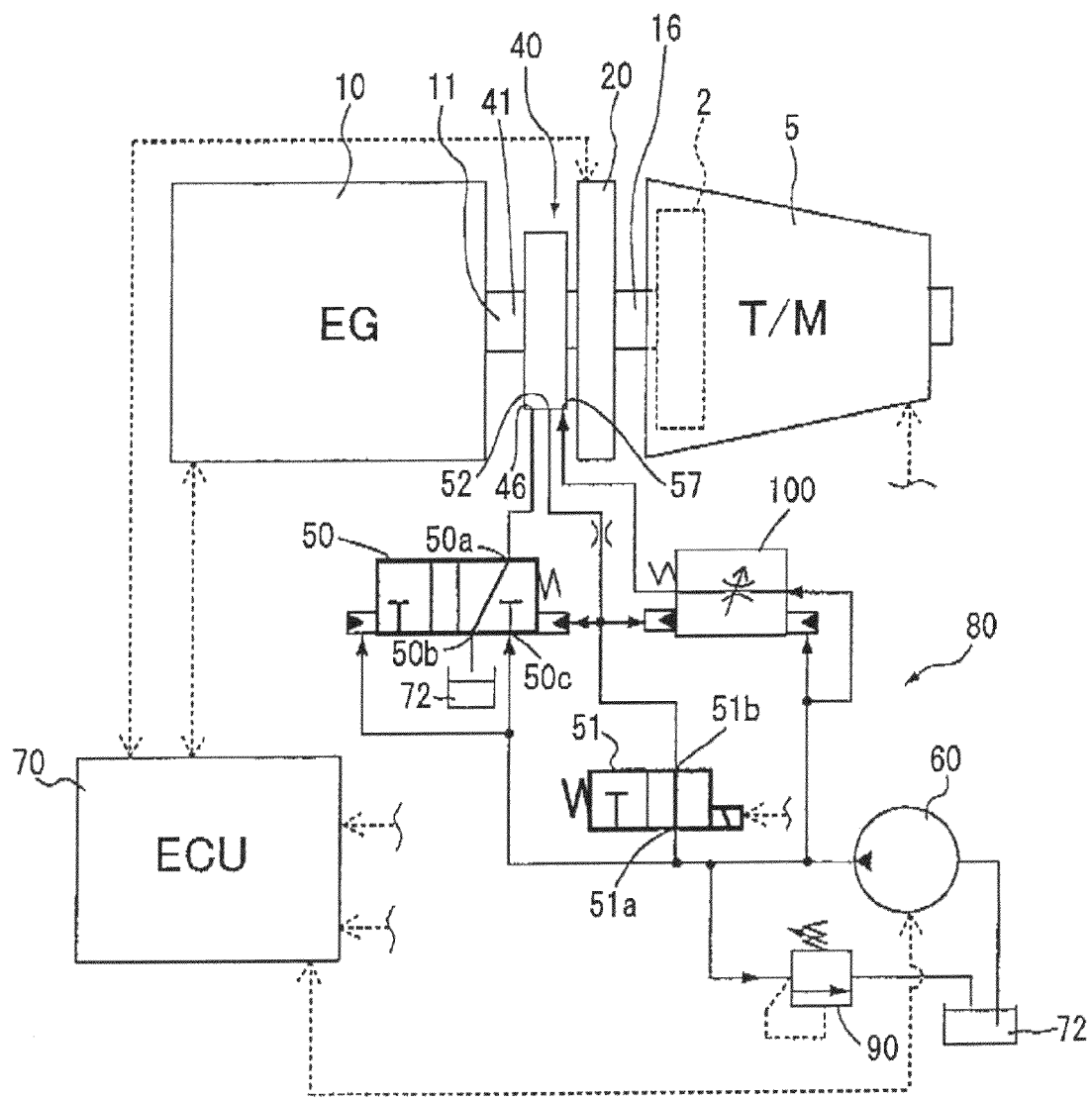
FIG. 1 is a schematic view of a clutch control system of a clutch apparatus for a hybrid vehicle according to an embodiment disclosed here.

A clutch control system 80 controlling a clutch apparatus 40 for a hybrid vehicle will be explained with reference to the attached drawings. FIG. 1 schematically illustrates the clutch apparatus 40 for a hybrid vehicle including an engine 10 (which is indicated as EG in FIG. 1) and an automatic transmission apparatus 5 (which is indicated as T/M in FIG. 1), and the clutch control system 80 according to the present embodiment. In FIG. 1, each solid arrow indicates a hydraulic piping connecting devices and a flow direction of hydraulic oil, and each dashed arrow indicates a control signal line.

Figure 2:
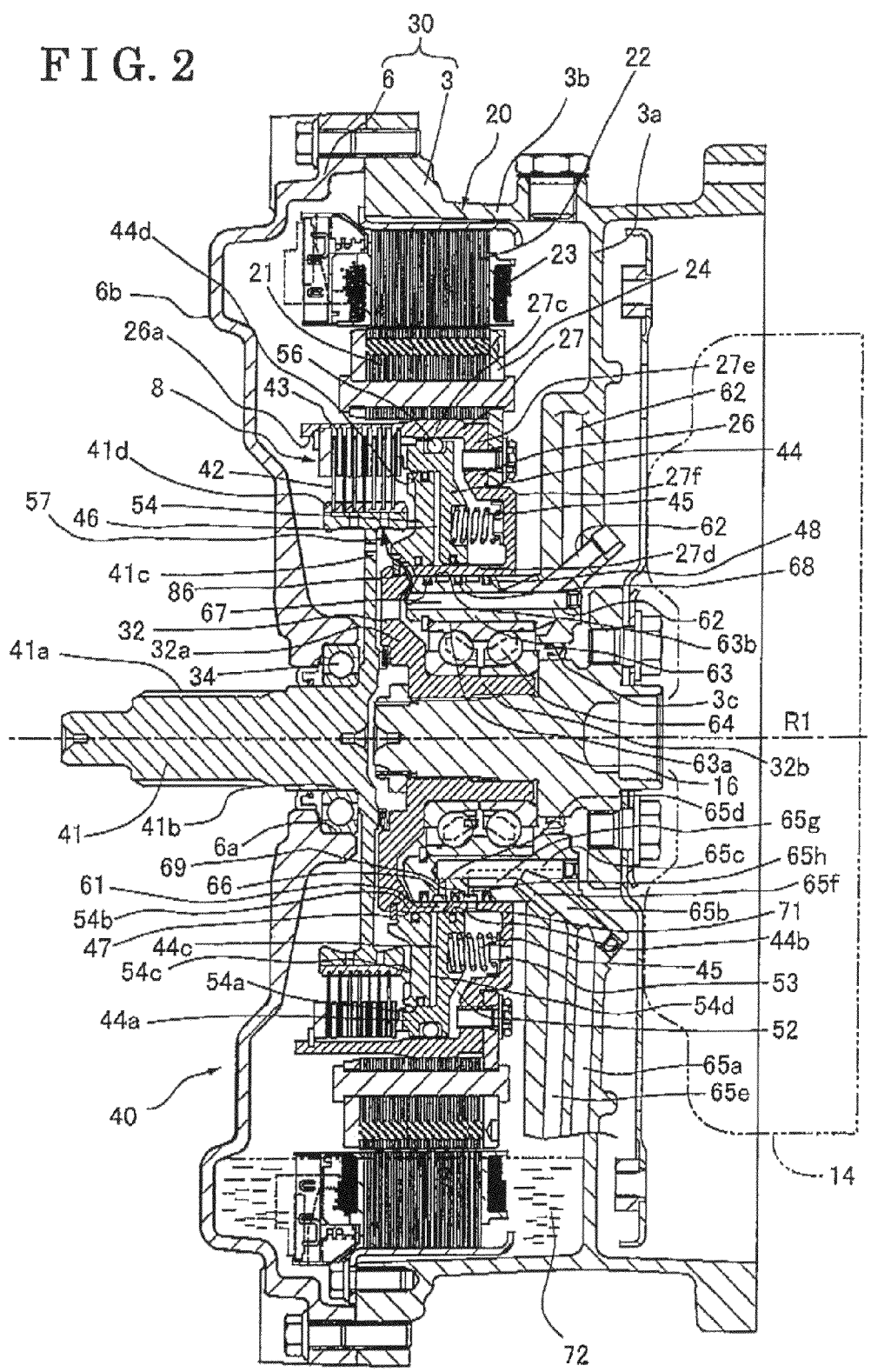
FIG. 2 is a partially cross-sectional view of the clutch apparatus illustrated in FIG. 1.

In FIG. 1, the clutch control system 80 including an electric oil pump 60, a switching valve 50, a control valve 51, and a regulator valve 100, a reservoir 72, and a relief valve 90 are illustrated separately from an electric motor 20, for example. Nevertheless, the clutch control system 80 and the relief valve 90 are in fact integrally provided with the electric motor 20 and a case 30. In addition, the reservoir 72 is formed at a lower side in a gravity direction within a body case 3 and a front case 6 constituting the case 30 as illustrated in FIG. 2. The switching valve 50, the control valve 51, and the regulator valve 100 are schematically illustrated in FIG. 1 for simply illustrating inner piping.

The clutch apparatus 40 formed by a wet multi-plate clutch is arranged between the engine 10 and the electric motor 20 as illustrated in FIG. 1. The clutch apparatus 40 is connected in series to the engine 10 and the electric motor 20. The clutch apparatus 40 selectively connects and disconnects the engine 10 and the electric motor 20 to thereby switch between a connecting state and a disconnecting state, the disconnecting state being obtained by interrupting a torque transmission from the engine 10. The clutch apparatus 40 includes a normally closed type for connecting the engine 10 to the electric motor 20 in a state where a vehicle is stopped.

The automatic transmission apparatus 5 for a vehicle is connected in series to the electric motor 20. Driving wheels for a vehicle are connected to the automatic transmission apparatus 5 via a differential apparatus. The automatic transmission apparatus 5 includes a torque converter 2 and a transmission. An output of the torque converter 2 is input to an input shaft of the transmission. In the present embodiment, one side of the electric motor 20 at which the engine 10 is provided is defined to be a front side and the other side of the electric motor 20 at which the automatic transmission apparatus 5 is provided is defined to be a rear side. Hereinafter, the front side corresponds to a side facing the engine 10 while the rear side corresponds to a side facing the automatic transmission apparatus 5.

As illustrated in FIGS. 1 and 2, the electric motor 20 and the torque converter 2 are rotatably connected to each other via a drum 26 serving as an output shaft and a center piece 16 that is an input shaft of the torque converter 2. The drum 26 and the center piece 16 are arranged in line with an input shaft 41 of the clutch apparatus 40 along a common rotation axis (rotation axis line) R1. The drum 26 and the center piece 16 are connected to a front cover 14 of the torque converter 2 so as to integrally rotate with the front cover 14.

In association with the rotation of the front cover 14 together with the center piece 16, a pump impeller provided within the torque converter 2 and connected to the front cover 14 rotates. Accordingly, an oil flow is generated by the pump impeller to cause a turbine runner connected to the input shaft of the transmission to rotate. The rotation of the turbine runner is then transmitted to the input shaft of the transmission. Rotation axes of the drum 26 (the output shaft), the center piece 16, and the front cover 14 are arranged on the common rotation axis R1 together with the input shaft of the transmission.

The engine 10 is constituted by a normal internal combustion engine generating an output by hydrocarbon fuel. The engine 10, however, is not limited to such configuration and may have any configuration as long as the engine 10 serves as a drive source for driving a rotation shaft. In addition, the electric motor 20 is a three-phase synchronous motor for driving vehicle wheels according to the present embodiment. The electric motor 20, however, is not limited to the three-phase synchronous motor. Further, the transmission of the automatic transmission apparatus 5 is a normal type planetary gear transmission. The transmission of the automatic transmission apparatus 5, however, is not limited to the normal type planetary gear transmission and may be an automated manual transmission in which a gear shifting of a manual transmission is automated, or any other automatic transmission.

Figure 3:
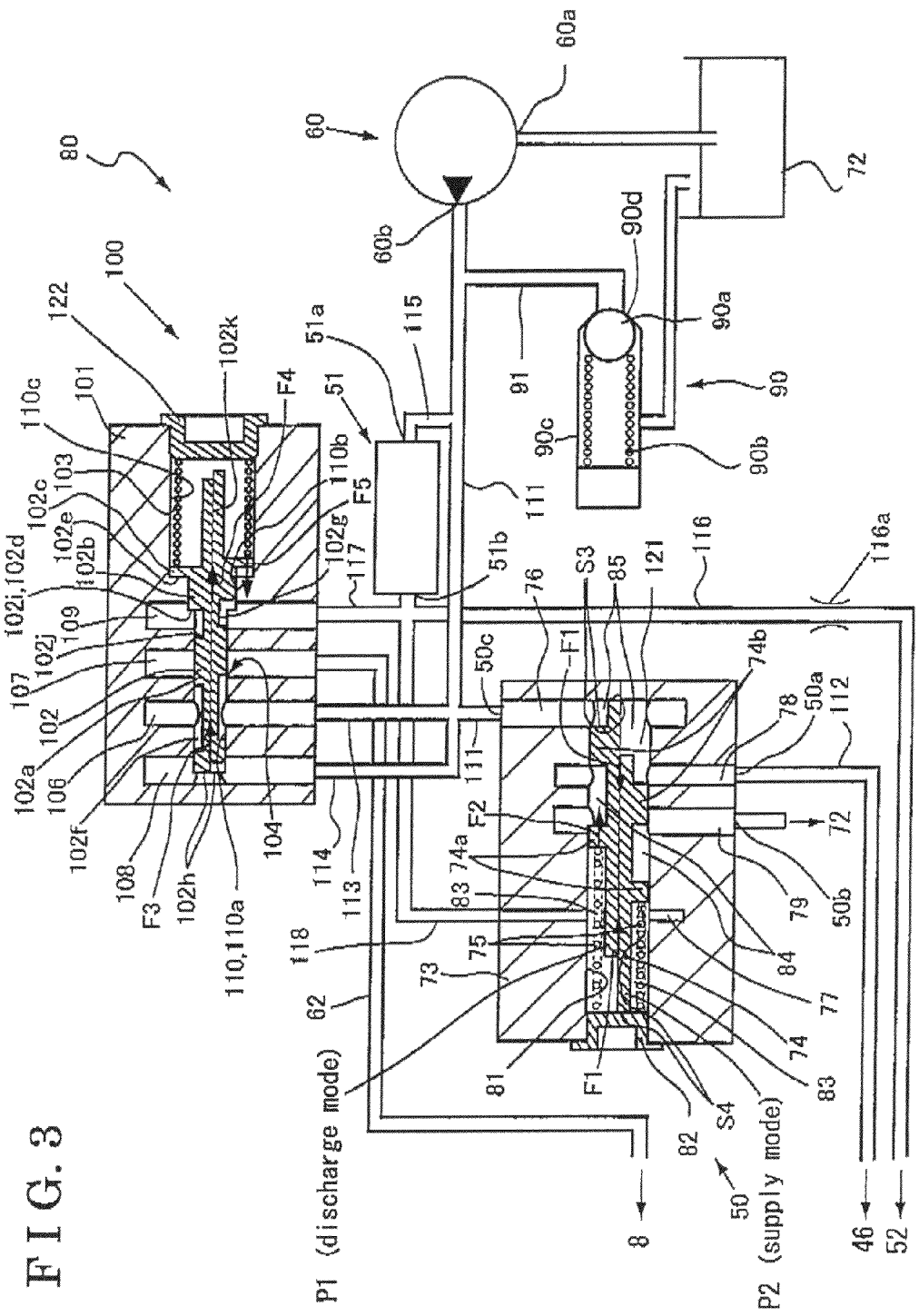
FIG. 3 is a partially enlarged view of the clutch control system illustrated in FIG. 1.

As illustrated in FIGS. 2 and 3, the clutch apparatus 40 includes the case 30, the input shaft 41, the drum 26, the center piece 16, plural separate plates 43 and friction plates 42 corresponding to a clutch portion 8, a piston member 44, a compression coil spring 45 serving as a compression spring, a wall member 54, a pressurized chamber 46, a canceller chamber 52, and the clutch control system 80.

The case 30 supports the input shaft 41, the drum 26, and the center piece 16 to be rotatable on the rotation axis R1. The reservoir 72 that stores a hydraulic oil serving as a hydraulic fluid is formed at a lower side in a gravity direction in the case 30. As illustrated in FIG. 2, the body case 3 of the case 30 includes an outer peripheral wall portion 3b forming an outline and a rear side wall portion 3a formed between the electric motor 20 and the torque converter 2. The outer peripheral wall portion 3b extends rearward from the rear side wall portion 3a by a predetermined amount to cover a portion of the torque converter 2. The body case 3 formed to extend is fixed to a case that covers a remaining portion of the torque converter 2 by a bolt to thereby form a case of the automatic transmission apparatus 5.

The front case 6 serving as a cover portion of the case 30 and including a front side wall portion 6b is arranged at a front side of the body case 3. The body case 3 and the front case 6 are fixed to each other by a bolt. A penetration bore 6a is formed at a center portion of the front side wall portion 6b so that the input shaft 41 is pivotally supported by the penetration bore 6a. A ball bearing 34 is disposed between the penetration bore 6a and the input shaft 41 to pivotally support the input shaft 41.

The input shaft 41 is rotatably connected to an output shaft 11 of the engine 10 via a flywheel and a damper absorbing a rotational vibration. As illustrated in FIG. 2, the input shaft 41 includes a fixed portion 41a fixed to the damper and a connected portion 41b rotatably supported by the penetration bore 6a of the front case 6. The input shaft 41 also includes an annular disc portion 41c of which an outer peripheral portion is formed by a small diameter engagement portion 41d. The plural friction plates 42 each in an annular form engage with the small diameter engagement portion 41d to be inhibited from rotating and to be movable in a direction of the rotation axis R1 (which will be hereinafter referred to as a rotation axis direction). As illustrated in FIG. 2, the annular disc portion 41c is formed to extend in a radial direction of the input shaft 41.

The drum 26 is rotatably connected to the center piece 16 serving as the input shaft of the torque converter 2. The center piece 16 is rotatably supported by a penetration bore 3c formed at the rear side wall portion 3a of the body case 3.

The drum 26 is formed in a reverse S-shape in a cross section in the rotation axis direction as illustrated in FIG. 2. The drum 26 includes an outer peripheral open portion 27 formed at a radially outer side to open forward, and an inner peripheral open portion 32 formed at a radially inner side to open rearward. The outer peripheral open portion 27 formed to be surrounded by a small diameter wall portion 27d, a large diameter wall portion 27c, stepped bottom wall portions 27e and 27f. A large diameter engagement portion 26a is formed at an inner peripheral surface of the large diameter wall portion 27c facing the input shaft 41 so that the plural separate plates 43 each in an annular form engage with the large diameter engagement portion 26a to be inhibited from rotating and to be movable in the rotation axis direction.

As illustrated in FIG. 2, the plural separate plates 43 and the plural friction plates 42 engaging with the small diameter engagement portion 41d of the input shaft 41 are alternately arranged to be engageable and disengageable relative to one another to form the clutch portion 8. When the separate plates 43 are pushed forward in the rotation axis direction by the piston member 44 in a state where the friction plates 42 and the separate plates 43 are alternately arranged one another, the separate plates 43 move, i.e., slide, in an axial direction of the input shaft 41.

Accordingly, a friction lining attached to each side surface of each of the friction plates 42 and each of the separate plates 43 are pressed to engage with each other so that the input shaft 41, the drum 26, and the center piece 16 are rotatably connected to one another. Consequently, the output shaft 11 of the engine 10 and the input shaft of the automatic transmission apparatus 5 rotate integrally.

An annular projecting portion 63 is formed to project to a void opening rearward and defined by the inner peripheral open portion 32 and the small diameter wall portion 27d of the outer peripheral open portion 27. Then, an inner peripheral surface of the small diameter wall portion 27d of the outer peripheral open portion 27 is fitted to an outer peripheral surface 63b of the projecting portion 63, A ball bearing 64 is disposed between an inner peripheral surface 63a of the projecting portion 63 and a fixation portion 32b of the inner peripheral open portion 32 so that the projecting portion 63 and the inner peripheral open portion 32 are smoothly rotatable relatively to each other.

As illustrated at an upper center portion in FIG. 2, a conduit 62 is continuously formed by penetrating through respective inner portions of the rear side wall portion 3a and the projecting portion 63. The conduit 62 is connected to a drain port 107 of the regulator valve 100 of the clutch control system 80 which will be explained later. The conduit 62 penetrates forward through the projecting portion 63 to be connected to the clutch portion 8. The conduit 62, a void formed between the projecting portion 63 and a front wall portion 32a of the inner peripheral open portion 32, a penetration bore 86 penetrating through the small diameter wall portion 27d of the outer peripheral open portion 27, and a void from the penetration bore 86 to the clutch portion 8 form a lubrication flow passage 57.

As illustrated at a lower center portion in FIG. 2, conduits 65a, 65b, 65c, and 65d are formed to be connected to one another by penetrating through the respective inner portions of the rear side wall portion 3a and the projecting portion 63. The conduits 65a, 65b, 65c, and 65d connect a connection port 78 of the switching valve 50 of the clutch control system 80 which will be explained later, and the pressurized chamber 46 to each other, The conduit 65a is connected to the connection port 78. The conduit 65d is a connection conduit connected to the pressurized chamber 46. Specifically, the conduit 65d is connected to an oil passage 66 formed to be recessed at an entire periphery of the outer peripheral surface 63b of the projecting portion 63 and connected to the pressurized chamber 46. The oil passage 66 is connected to the pressurized chamber 46 via an inflow port 61 that penetrates through the small diameter wall portion 27d of the outer peripheral open portion 27 to thereby supply the hydraulic oil to the pressurized chamber 46 and discharges the hydraulic oil from the pressurized chamber 46 at a predetermined pressure.

Conduits 65e, 65f, 65g, and 65h are formed to be connected to one another by penetrating through the respective inner portions of the rear side wall portion 3a and the projecting portion 63. The conduits 65e, 65f, 65g, and 65h connect a discharge port 51 b of the control valve 51 of the clutch control system 80 to the canceller chamber 52. The conduit 65e is connected to the discharge port 51b. The conduit 65h is a connection conduit connected to the canceller chamber 52. Specifically, the conduit 65h is connected to an oil passage 69 formed to be recessed at the entire periphery of the outer peripheral surface 63b of the projecting portion 63 and connected to the canceller chamber 52. The oil passage 69 is connected to the canceller chamber 52 via an inflow port 71 that penetrates through the small diameter wall portion 27d of the outer peripheral open portion 27 to thereby supply the hydraulic oil to the canceller chamber 52.

Grooves are formed at the entire periphery of the outer peripheral surface 63b of the projecting portion 63 at front and rear sides of the oil passages 66 and 69 in the rotation axis direction. Annular rings 67, 68, and 48 are provided at the respective grooves, for example, to inhibit the hydraulic oil from leaking to the outside from the oil passages 66 and 69.

The piston member 44 is fitted within the outer peripheral open portion 27 to be slidable in the rotation axis direction. The piston member 44 in a substantially disc form includes a penetration bore 44b at a center. The piston member 44 is axially movably fitted to an outer peripheral surface of the small diameter wall portion 27d of the outer peripheral open portion 27 via an O-ring made of rubber, for example, formed at the piston member 44. The piston member 44 includes a pressure-receiving surface 44c at a front side serving as a flat surface orthogonal to the axis of the input shaft 41. The piston member 44 also includes a pressing portion 44a at an outer peripheral side of the pressure-receiving surface 44c to axially project forward, i.e., towards the input shaft 41.

The pressing portion 44a in an annular form includes a sliding surface 44d at an inner peripheral surface. The sliding surface 44d is fitted to an outer peripheral surface 54a of the wall member 54 so that the piston member 44 is slidable in the rotation axis direction. An outer peripheral surface of the pressing portion 44a of the piston member 44 is fluid-tightly fitted to an inner peripheral surface of the large diameter wall portion 27c of the outer peripheral open portion 27 via an O-ring 56 made of rubber, The piston member 44 is thus movable relative to the large diameter wall portion 27c in the rotation axis direction.

The wall member 54 is mounted to the small diameter wall portion 27d of the outer peripheral open portion 27. The wall member 54 includes the outer peripheral surface 54a, an inner peripheral surface 54b, a front flat surface 54c, and a rear flat surface 54d. A fixation ring 47 formed by a C-ring, for example, is fitted to the front side of the wall member 54 at the outer peripheral surface of the small diameter wall portion 27d to restrict a forward movement of the wall member 54.

An O-ring made of rubber is provided at the inner peripheral surface 54b of the wall member 54 to fluid-tightly seal the pressurized chamber 46. In order to form the lubrication flow passage 57, a diameter of a portion of the inner peripheral surface 54b of the wall member 54 at the front side is enlarged. Therefore, the hydraulic oil (lubricant) flows through the lubrication flow passage 57 without being interrupted by the wall member 54 when sent out from the penetration bore 86. The hydraulic oil (lubricant) may disperse towards the friction plates 42 and the separate plates 43, i.e., towards the clutch portion 8, The clutch portion 8 is effectively lubricated and cooled accordingly. The outer peripheral surface 54a of the wall member 54 is fitted to the sliding surface 44d serving as the inner peripheral surface of the pressing portion 44a of the piston member 44. An O-ring made of rubber is provided at the outer peripheral surface 54a of the wall member 54 to fluid-tightly seal the pressurized chamber 46.

The hydraulic oil including a predetermined pressure corresponding to a first predetermined fluid pressure is supplied to the pressurized chamber 46 so as to bring the clutch portion 8 to a disconnected state to interrupt a torque transmission. In a case where the hydraulic oil at the first predetermined fluid pressure is supplied to the pressurized chamber 46, the piston member 44 moves against a biasing force of the compression coil spring 45 to thereby release a connected state of the clutch portion 8.

The pressurized chamber 46 is defined and formed within the outer peripheral open portion 27 in a state to be surrounded by the rear flat surface 54d of the wall member 54, the pressure-receiving surface 44c of the piston member 44, the sliding surface 44d of the pressing portion 44a, and the outer peripheral surface of the small diameter wall portion 27d of the outer peripheral open portion 27. As mentioned above, the pressurized chamber 46 is connected to the electric oil pump 60, the regulator valve 100 and the reservoir 72, for example, via the inflow port 61, the oil passage 66, the conduits 65d, 65c, 65b, 65a, and the switching valve 50.

In a case where the hydraulic oil at the first predetermined fluid pressure is supplied to the pressurized chamber 46, a switching valve element 74 of the switching valve 50 is shifted to a second position P2 so as to bring the switching valve 50 to a supply mode. In a case where the hydraulic oil is discharged from the pressurized chamber 46, the switching valve element 74 is shifted to a first position P1 so as to bring the switching valve 50 to a discharge mode. The switching valve 50 is switchable between the second position P2 and the first position 1 by controlling the control valve 51 formed by an electromagnetic valve to open and close. Details of the control valve 51 will be explained later.

An appropriate amount of hydraulic oil is supplied to the canceller chamber 52 in a case where the clutch portion 8 is brought to the connected state. The drum 26 (the canceller chamber 52) rotates about the rotation axis R1 to rotate an appropriate amount of hydraulic oil supplied to the canceller chamber 52, which generates a centrifugal oil pressure within the canceller chamber 52. The aforementioned centrifugal oil pressure biases the piston member 44 in a direction in which the clutch portion 8 is brought to the connected state. The centrifugal oil pressure at the canceller chamber 52 cancels out a centrifugal oil pressure serving as a centrifugal fluid pressure generated by a remaining hydraulic oil at the pressurized chamber 46 to move the clutch portion 8 in a direction to be bought to the disconnected state.

The canceller chamber 52 is defined and formed in a state to be surrounded by a rear surface of the piston member 44 and the outer peripheral open portion 27. As mentioned above, the canceller chamber 52 is connected to the electric oil pump 60, for example, via the inflow port 71, the oil passage 69, the conduits 65h, 65g, 65f, 65e, and the control valve 51. The inflow port 71 includes three ports, for example, arranged at even intervals on the circumference of the small diameter wall portion 27d. At this time, however, the number of ports of the inflow port 71 is not limited to three and may be appropriately decided depending on a magnitude of pressure or a flow volume of hydraulic oil supplied to the canceller chamber 52.

A discharge bore 53 is formed at the canceller chamber 52 while including a predetermined opening diameter through which inside and outside of the canceller chamber 52 are connected to each other. Specifically, the discharge bore 53 penetrates through an end surface of the outer peripheral open portion 27 at which an end surface of the compression coil spring 45 is seated (i.e., the bottom wall portion 27f of the outer peripheral open portion 27). At this time, the outside of the canceller chamber 52 corresponds to the inside of the case 30, specifically, the canceller chamber 52 is connected to the reservoir 72 serving as an oil storage chamber. The discharge bore 53 functions as a flow volume restriction. The opening diameter of the discharge bore 53 and a radial distance between an axis of the discharge bore 53 and the rotation axis RI influence a discharge speed of the hydraulic oil and the centrifugal oil pressure at the canceller chamber 52, a responsiveness for switching the clutch apparatus 40 from the connected state to the disconnected state, and an electric power regeneration efficiency.

As illustrated in FIG. 2, the compression coil spring 45 is disposed in a compressed manner between the rear surface of the piston member 44 and the bottom wall portion 27f of the outer peripheral open portion 27. Specifically, plural compression coil springs 45 are arranged at even intervals on the same radius relative to the rotation axis R1 so as not to block the discharge bore 53 penetrating through the bottom wall portion 27f.

Each of the compression coil springs 45 biases the piston member 44 forward to press the friction plates 42 and the separate plates 43 by the pressing portion 44a of the piston member 44 at a predetermined load, which results in a pressed contact between the friction plates 42 and the separate plates 43 with one another. A cylindrical bore having a bottom is formed to be recessed at a rear surface of the piston member 44 at which the compression coil spring 45 is arranged. The cylindrical bore includes a slightly greater diameter than a coil outer diameter of the compression coil spring 45 so that the compression coil spring 45 engages with the cylindrical bore.

The number of compression coil springs 45 is not specified and any number is acceptable as long as the biasing force is applied to press and engage the friction plates 42 and the separate plates 43 with one another and the pressing portion 44a uniformly presses the friction plates 42 and the separate plates 43 over an entire circumference.

The electric motor 20 formed by a three-phase AC motor, for example, is arranged at an outer peripheral side of the outer peripheral open portion 27 of the drum 26 as illustrated in FIG. 2. The electric motor 20 includes a rotor 21 in a cylindrical form, a stator 22 formed by a lamination of silicon steel plates that is arranged to face a radially outer periphery of the rotor 21, and a coil 23 wound on a projecting portion of the stator 22. The rotor 21 is rotatable relative to the stator 22 by a generation of a magnetically repulsive force or suction force between the rotor 21 and the stator 22.

An outer periphery of the stator 22 is fixed to an inner peripheral surface of the outer peripheral wall portion 3b of the body case 3. In addition, a plate member 24 projects from a rear end surface of the rotor 21 to a radially inner side to be fixed to a rear side surface of the bottom wall portion 27e of the drum 26. As a result, the rotor 21 in the electric motor 20 integrally rotates with the drum 26, The coil 23 is electrically connected to a controller 70, which will be hereinafter referred to as an ECU 70. The ECU 70 controls a rotation of the rotor 21 by controlling a power supply level to the coil 23 or controlling to stop a power supply to the coil 23 based on signals from sensors for detecting various states, for example, a vehicle speed sensor, a throttle opening sensor, and a shift position sensor.

The clutch control system 80 is explained with reference to FIG. 3. As illustrated in FIG. 3, the clutch control system 80 includes, for example, the electric oil pump 60, the switching valve 50, the control valve 51, the regulator valve 100, and the relief valve 90. The electric oil pump 60 and the control valve 51 are connected to the ECU 70 to be controlled thereby.

The electric oil pump 60 supplies the hydraulic oil to the regulator valve 100, the pressurized chamber 46, the canceller chamber 52, and the clutch portion 8, for example, As illustrated in FIG. 3, the electric oil pump 60 includes an intake port 60a constantly connected to the reservoir 72.

The electric oil pump 60 also includes a discharge port 60b connected to an input port 76 of the switching valve 50 via a port 50c. The input port 76 is selectively connected to and disconnected from the connection port 78 by a movement of the switching valve element 74 of the switching valve 50 to the first position P1 and the second position P2, In a case where the input port 76 is connected to the connection port 78, the discharge port 60b of the electric oil pump 60 is connected to the pressurized chamber 46 via the input port 76 and the connection port 78. At this time, the discharge port 60b is connected to a first output port 106 and a controlled pressure port 108 of the regulator valve 100.

An oil passage connecting the discharge port 60b and the input port 76 (the port 50c) serves as a first pressurized chamber oil passage 111. An oil passage connecting the connection port 78 (a port 50a) and the conduit 65a connected to the pressurized chamber 46 serves as a second pressurized chamber oil passage 112. Oil passages branched from a portion of the first pressurized chamber oil passage 111 to be connected to the first output port 106 and to the controlled pressure port 108 of the regulator valve 100 serve as a first output port oil passage 113 and a controlled pressure port oil passage 114 respectively.

The discharge port 60b of the electric oil pump 60 is connected to an input port 51a of the control valve 51 via the first pressurized chamber oil passage 111 and a first canceller chamber oil passage 115 that is branched from a portion of the first pressurized chamber oil passage 111. The discharge port 51b of the control valve 51 is connected to the canceller chamber 52 via a second canceller chamber oil passage 116. An aperture 116a including a predetermined aperture diameter is formed at a portion of the second canceller chamber oil passage 116. A volume of hydraulic oil flowing through the second canceller chamber oil passage 116 is restricted by the aperture 116a so that an appropriate volume of hydraulic oil is supplied to the canceller chamber 52.

The control valve 51 is a normally open electromagnetic valve. As illustrated in FIG. 1, the control valve 51 is a two-position electromagnetic valve by including two ports, i.e., the ports 51a and 51b. The control valve 51 allows and prohibits the supply of hydraulic oil discharged from the discharge port 60b of the electric oil pump 60 to a downstream side by opening and closing (on and off).

In a case where the electric oil pump 60 is operated in a state where the control valve 51 is opened, the hydraulic oil discharged from the discharge port 60b of the electric oil pump 60 is supplied to the control valve 51 via the first canceller chamber oil passage 115 and the input port 51a. The hydraulic oil supplied to the control valve 51 is then supplied to the canceller chamber 52 via the discharge port 51b of the control valve 51 and the oil passage 116, to a switch port 77 of the switching valve 50 via the discharge port 51b and a switch port oil passage 118, and to a second output port 109 of the regulator valve 100 via the discharge port 51b and a second output port oil passage 117. The aperture 116a including the predetermined aperture diameter is provided at the portion of the second canceller chamber oil passage 116. Accordingly, an appropriate volume of hydraulic oil is supplied to the canceller chamber 52.

The discharge port 51b of the control valve 51 is connected to the second output port 109 of the regulator valve 100 by the second output port oil passage 117 that is branched from a portion of the second canceller chamber oil passage 116. The discharge port 51b is also connected to the switch port 77 of the switching valve 50 by the switch port oil passage 118 that is branched from the portion of the second canceller chamber oil passage 116. The electric oil pump 60 is controlled by the ECU 70 to discharge the hydraulic oil of desired flow volume and pressure.

As illustrated in FIGS. 1 and 3, the switching valve 50 is a two-position on-off valve while including three ports 50a, 50b, and 50c. The switching valve 50 allows and prohibits the supply of hydraulic oil from the electric oil pump 60 to the pressurized chamber 46. In a case where the supply of hydraulic oil to the pressurized chamber 46 is prohibited, the pressurized chamber 46 is connected to the reservoir 72 so that the hydraulic oil within the pressurized chamber 46 is discharged to the reservoir 72 via the switching valve 50.

As illustrated in FIG. 3, the switching valve 50 includes a valve housing 73 in a column form or a rectangular solid form, the switching valve element 74, and a compression coil spring 75 serving as a switching valve elastic member. In FIG. 3, configurations of the switching valve element 74 and the compression coil spring 75 illustrated at an upper side (i.e., an upper illustration) relative to an axis of the switching valve element 74 are different from configurations of the switching valve element 74 and the compression coil spring 75 illustrated at a lower side (i.e., a lower illustration) relative to the axis of the switching valve element 74. The upper illustration and the lower illustration indicate different operation conditions of the switching valve element 74 and the compression coil spring 75. Specifically, the upper illustration indicates the first position P1 (the discharge mode) while the lower illustration indicates the second position P2 (the supply mode).

The valve housing 73 includes the input port 76, the switch port 77, the connection port 78, and a switching valve drain port 79. The input port 76 is supplied with the hydraulic oil regulated to a predetermined pressure corresponding to a first or second predetermined fluid pressure in a state where the port 50c of the input port 76 is connected to the electric oil pump 60 via the first pressurized chamber oil passage 111 and the electric oil pump 60 is operated.

The switch port 77 is connected to the discharge port 51b of the control valve 51 via the switch port oil passage 118. In a case where the electric oil pump 60 is operated and the control valve 51 is opened, the switch port 77 is supplied with the hydraulic oil regulated to the second predetermined fluid pressure. At this time, the connection port 78 is connected to the pressurized chamber 46 via the port 50a serving as a supply/discharge port of the connection port 78 and the second pressurized chamber oil passage 112. The switching valve drain port 79 is connected to the reservoir 72 that stores the hydraulic oil in an atmospheric pressure state via the port 50b serving as a discharge port of the switching valve drain port 79. The hydraulic oil discharged from the pressurized chamber 46 is supplied to the switching valve drain port 79 via the connection port 78 and thereafter discharged to the reservoir 72. The aforementioned state of the switching valve 50 is defined to be the discharge mode.

The valve housing 73 is attachable to the body case 3 or is integrally formed at the body case 3. For example, the valve housing 73 is an aluminum case. As illustrated in FIG. 3, the valve housing 73 includes the switch port 77, the switching valve drain port 79, the connection port 78, and the input port 76 each of which is a void in a column form and which are arranged and aligned in the mentioned order from the left in FIG. 3. A penetration bore 81 is formed at the valve housing 73 to extend and penetrate from an end surface of the valve housing 73 facing the switch port 77. The penetration bore 81 penetrates through the ports 77, 79, and 75 to reach the input port 76 in a state to be orthogonal to axes of the ports 77, 79, and 78. A bolt 82 is screwed onto an end portion (i.e., a left end in FIG. 3) of the penetration bore 81. An oil seal mechanism is provided at a threaded portion of the bolt 82 so that the hydraulic oil flowing to the penetration bore 81 is inhibited from leaking.

The switching valve element 74 in a column form is arranged to be axially movable within the penetration bore 81. Shaft diameters of axial end portions and an intermediate portion of the switching valve element 74 are reduced by the same amount to form reduced diameter portions. As a result, three voids are formed between the reduced diameter portions and an inner peripheral surface of the penetration bore 81 for flowing or storing the hydraulic oil. The three voids corresponds to voids 83, 84, and 85 from the left in FIG. 3.

The hydraulic oil supplied to the switch port 77 is stored at the void 83. In a case where the hydraulic oil is stored at the void 83, an oil pressure Pa serving as a fluid pressure is applied to a side surface of a flange portion 74a of the switching valve element 74 obtained by the reduced diameter portion, and a first axial end surface of the switching valve element 74. The switching valve element 74 is biased to the input port 76 by a biasing force F1. The aforementioned side surface of the flange portion 74a and the first axial end surface of the switching valve element 74 are specified to be a fourth pressure-receiving surface S4. At this time, the compression coil spring 75 is arranged and compressed within the void 83 formed between the flange portion 74a and the bolt 82 to bias the switching valve element 74 to the input port 76 by a biasing force F2. Accordingly, the switching valve element 74 is biased to the input port 76 by the biasing force (F1+F2). At this time, the oil pressure Pa, areas of the side surface of the flange portion 74a and the first axial end surface of the switching valve element 74 serving as the fourth pressure-receiving surface S4 orthogonal to the axis of the switching valve element 74, and a spring load of the compression coil spring 75, for example, are specified so that the biasing force F1 is greater than the biasing force F2 (i.e., a relationship of F1>F2 is obtained).

In a case where the same level of the oil pressure Pa as of the hydraulic oil supplied to the switch port 77 is applied to the input port 76 (the void 85), a side surface of a flange portion 74b of the switching valve element 74 obtained by the reduced diameter portion and a second axial end surface of the switching valve element 74 receive the oil pressure Pa. The aforementioned side surface of the flange portion 74b and the second axial end surface of the switching valve element 74 are specified to be a third pressure-receiving surface 53. The switching valve element 74 is biased to the switch port 77 by a biasing force −F1 in the axial direction. Consequently, in a case where the oil pressure Pa is applied to the switch port 77 and the input port 76 at the same time, the biasing force for biasing the switching valve element 74 in the axial direction is cancelled, i.e., the biasing force F1 and the biasing force −F1 are balanced out.

When the biasing force for biasing the switching valve element 74 in the axial direction by the oil pressure Pa is cancelled, the biasing force of the compression coil spring 75 only remains so as to bias the switching valve element 74 to the input port 76 in the axial direction by the biasing force F2. As a result, an end portion of the switching valve element 74 moves to an inner wall surface of the input port 76 (i.e., a surface of the input port 76 at a right side in FIG. 3) to make contact therewith, and then stops. The position at which the switching valve element 74 is thus stopped corresponds to the first position P1 of the switching valve element 74. The switching valve element 74 illustrated at the upper side relative to the axis of the switching valve element 74 in FIG. 3 is in the first position P1. In addition, the state of the switching valve 50 when the switching valve element 74 is in the first position P1 is specified to be the discharge mode (i.e., the switching valve 50 is in a closed state).

In a state where the switching valve element 74 is in the first position P1, one direction of the void 85 in which the input port 76 is connected to the electric oil pump 60 is only opened, i.e., the void 85 is in an envelope form. The communication between the input port 76 and the connection port 78 is thus interrupted. At this time, the void 84 obtained by the reduction of the diameter of the intermediate portion of the switching valve element 74 is arranged across the connection port 78 and the switching valve drain port 79. As a result, the connection port 78 and the switching valve drain port 79 are connected to thereby connect the pressurized chamber 46 and the reservoir 72 to release the pressurized chamber 46.

Next, a case where the control valve 51 is controlled to close and the hydraulic oil is inhibited from flowing to the switch port 77 in a state where the oil pressure Pa is applied to the void 85 in the aforementioned manner will be explained. When the hydraulic oil is inhibited from flowing to the switch port 77, the biasing force −F1 by the oil pressure Pa applied to the input port 76 biasing the switching valve element 74 overcomes the biasing force F2 of the compression coil spring 75 to thereby move the switching valve element 74 towards the switch port 77. Then, the first axial end surface of the switching valve element 74 makes contact with an end surface of the bolt 82, which results in the stop of the switching valve element 74. The position at which the switching valve element 74 is stopped in the aforementioned manner, i.e., moves to a leftmost position in FIG. 3 to be stopped, corresponds to the second position P2 of the switching valve element 74. The switching valve element 74 illustrated at the lower side relative to the axis of the switching valve element 74 in FIG. 3 is in the second position P2. In addition, the state of the switching valve 50 when the switching valve element 74 is in the second position P2 is specified to be the supply mode (i.e., the switching valve 50 is in an open state).

At this time, the void 85 is enlarged in the penetration bore 81, The connection port 78 is connected to the void 85 to form a connection passage 121. Accordingly, the input port 76 is connected to the pressurized chamber 46. In addition, in a state where the switching valve element 74 is in the second position P2 (i.e., the switching valve 50 is in the supply mode), the flange portion 74b of the switching valve element 74 interrupts the communication between the switching valve drain port 79 and the connection port 78 to thereby interrupt the connection between the pressurized chamber 46 and the reservoir 72.

Next, the regulator valve 100 according to the present embodiment will be explained in detail. The regulator valve 100 includes a housing 101, a valve element 102, and a coil spring 103 serving as an elastic member. The housing 101 is attachable to the body case 3 or is integrally formed at the body case 3. For example, the housing 101 is an aluminum case. As illustrated in FIG. 3, the housing 101 includes the controlled pressure port 108, the first output port 106, the drain port 107, and the second output port 109 all of which are recessed from an outer peripheral surface of the housing 101 and are arranged and aligned in the mentioned order from the left in FIG. 3. Each of the controlled pressure port 108, the first output port 106, the drain port 107, and the second output port 109 serves as a void in a column form. The drain port 107 is connected to the conduit 62 that is connected to the clutch portion 8 of the clutch apparatus 40.

In FIG. 3, configurations of the valve element 102 and the coil spring 103 illustrated at an upper side (i.e., an upper illustration) relative to an axis of the valve element 102 are different from configurations of the valve element 102 and the coil spring 103 illustrated at a lower side (i.e., a lower illustration) relative to the axis of the valve element 102. The upper illustration and the lower illustration indicate different operation conditions of the valve element 102 and the coil spring 103. Specifically, the upper illustration indicates an initial position, which will be explained later. The lower illustration indicates a state in which the hydraulic oil is supplied to the controlled pressure port 108 or to both the controlled pressure port 108 and the second output port 109, and the valve element 102 moves to a predetermined position by receiving the oil pressure of the hydraulic oil.

A penetration bore 110 including two steps is formed at the housing 101 so as to penetrate, from an end surface facing the second output port 109, through the second output port 109, the drain port 107, and the first output port 106. The penetration bore 110 includes a small diameter portion 110a, a medium diameter portion 110b, and a large diameter portion 110c. An end of the small diameter portion 110a reaches the controlled pressure port 108.

A bolt 122 is screwed on an opening end (i.e., a right end in FIG. 3) of the large diameter portion 110c of the penetration bore 110. An oil seal mechanism is provided at a threaded portion of the bolt 122 so that the hydraulic oil flowing to the penetration bore 110 is inhibited from leaking.

The valve element 102 in a column form is axially movably provided within the penetration bore 110. The valve element 102 includes a small diameter shaft portion 102a and a large diameter shaft portion 102b coaxially formed to each other. The valve element 102 also includes a flange portion 102c formed at an end portion of the large diameter shaft portion 102b. The small diameter shaft portion 102a penetrates through the second output port 109, the drain port 107, the first output port 106, and the controlled pressure port 108, At this time, an end surface of the small diameter shaft portion 102a forms a first pressure-receiving surface 102h. In a case where the oil pressure Pa at a predetermined level is applied to the controlled pressure port 108, the oil pressure Pa acts on the first pressure-receiving surface 102h, thereby axially biasing the valve element 102 towards the second output port 109 by a biasing force F3.

An end surface 102d connecting an outer peripheral surface of the large diameter shaft portion 102b to an outer peripheral surface of the small diameter shaft portion 102a is formed at a position at which the end surface 102d may receive the oil pressure Pa of the hydraulic oil supplied to the second output port 109. The flange portion 102c is arranged in a state where a first side surface 102e of the flange portion 102c (i.e., a left side surface of the flange portion 102c in FIG. 3) is in contact with a bottom surface of the large diameter portion 110c. Hereinafter, the position of the valve element 102 in the aforementioned manner will be referred to as the initial position. The valve element 102 is movable from the initial position to a right side in FIG. 3 by a predetermined amount.

A projection 102k is formed at a center of a second side surface of the flange portion 102c (i.e., a right side surface of the flange portion 102c in FIG. 3) so as to project towards the bolt 122. An end surface of the projection 102k makes contact with the bolt 122 to thereby restrict an excessive movement of the valve element 102 towards the bolt 122.

The coil spring 103 is arranged and compressed between the flange portion 102c of the valve element 102 and the bolt 122 within the large diameter portion 110c. The coil spring 103 biases the valve element 102 towards the controlled pressure port 108 in the axial direction. That is, in a state where the electric oil pump 60 is not operated, the valve element 102 is held at the initial position by the coil spring 103.

Cut grooves 102f and 102g of which diameters are reduced to have the same diameters as each other are formed at two portions at the outer peripheral surface of the small diameter shaft portion 102a of the valve element 102 over an entire circumference. In a state where the valve element 102 is in the initial position, the cut groove 102f is arranged to extend across the first output port 106 of which the axis is perpendicular to the axis of the valve element 102.

The cut groove 102g is arranged so that the pressure in the second output port 109 is received by opposing end surfaces of the cut groove 102g, i.e., end surfaces 102j and 102d, when the valve element 102 moves to any position within a movable range thereof. At this time, the end surface 102d, i.e., the right side surface of the cut groove 102g in FIG. 3, serves as a second pressure-receiving surface 102i including a larger area than an area of the left side surface of the cut groove 102g in FIG. 3, i.e., the end surface 102j. As a result, in a case where the hydraulic oil having the oil pressure Pa at a predetermined level is applied to the second output port 109, the valve element 102 is axially biased towards the coil spring 103 by a biasing force F4 that is obtained by multiplying an area difference between the second pressure-receiving surface 102i (the end surface 102d) and the end surface 102j by the oil pressure Pa.

The operation of the regulator valve 100 will be briefly explained below. In a case where the oil pressure Pa at a predetermined level is applied to the controlled pressure port 108 or to both the controlled pressure port 108 and the second output port 109, the first pressure-receiving surface 102h, or both the first pressure-receiving surface 102h and the second pressure-receiving surface 102i receives the oil pressure Pa. Then, the valve element 102 axially moves towards the coil spring 103 by the biasing force F3 or a biasing force (F3'+F4). At this time, the value F3' corresponds to a biasing force obtained in a state where the first pressure-receiving surface 102h is assumed to receive the second predetermined fluid pressure that is lower than the first predetermined fluid pressure received by the first pressure-receiving surface 102h only. Therefore, a relationship of F3>F3' is established. Various conditions are specified so that a biasing force F5 of the coil spring 103 generated when the valve element 102 is in the initial position is smaller than the biasing force F3 and a relationship of (F3'+F4)>F3 is obtained.

In a case where the valve element 102 moves, the oil pressure is stabilized when the oil pressure is balanced relative to the biasing force F5 and is regulated to a predetermined level of the oil pressure Pa. At this time, in a case where the oil pressure Pa is large so that the valve element 102 moves beyond a predetermined amount, an end surface of the cut groove 102*f* (i.e., a right end surface of the cut groove 102*f* In FIG. 3) is positioned within the drain port 107. As a result, the cut groove 102*f* (i.e., the first output port 106 connected to the cut groove 102*f*) and the drain port 107 are connected to each other, The position of the valve element 102 at that time is illustrated at the lower side relative to the axis of the switching valve element 74 in FIG. 3.

Accordingly, a movable aperture portion 104 serving as a connection portion between the end surface of the cut groove 102*f* and the drain port 107 is opened. Then, depending on an opening area of the movable aperture portion 104, the hydraulic oil at the first output port 106 is discharged to the drain port 107. When the hydraulic oil is discharged to the drain port 107, the oil pressure Pa of the first output port 106 is reduced. In response to the reduced oil pressure Pa, the valve element 102 moves leftward in FIG. 3 by the biasing force F5 of the coil spring 103 so that the movable aperture portion 104 is closed or the opening area thereof is maintained at a predetermined amount. In a case where the movable aperture portion 104 is closed, the oil pressure increases again and the aforementioned operation is repeated.

The oil pressure Pa is regulated to a predetermined level in the aforementioned manner. Load specification of the coil spring 103, the position of the cut groove 102*f*, pressure-receiving areas of the first pressure-receiving surface 102*h* and the second pressure-receiving surface 102*i*, for example, are determined so as to obtain a desired regulated pressure level of the oil pressure Pa. The regulated pressure of the controlled pressure port 108 and the first output port 106 obtained in a state where the hydraulic oil is supplied only to the controlled pressure port 108 and the first output port 106 corresponds to the first predetermined fluid pressure. The state of the regulator valve 100 at this time is referred to as a first mode. In addition, the regulated pressure of the controlled pressure port 108, the first output port 106, and the second output port 109 obtained in a state where the hydraulic oil is supplied to the controlled pressure port 108, the first output port 106, and the second output port 109 corresponds to the second predetermined fluid pressure. The state of the regulator valve 100 at this time is referred to as a second mode. As mentioned above, according to the present embodiment, the second predetermined fluid pressure is smaller than the first predetermined fluid pressure by a predetermined value. In the first mode, the oil pressure Pa of the hydraulic oil supplied to the pressurized chamber 46 is regulated to the first predetermined fluid pressure, In the second mode, the oil pressure Pa of the hydraulic oil supplied to the canceller chamber 52 is regulated to the second predetermined fluid pressure.

The hydraulic oil discharged to the drain port 107 functions as a drain lubricant to be supplied to the clutch portion 8 via the lubrication flow passage 57 formed by the conduit 62 that is formed at the respective inner portions of the rear side wall portion 3*a* and the projecting portion 63 and the penetration bore 86 penetrating through the small diameter wall portion 27*d* of the outer peripheral open portion 27, for example.

The relief valve 90 inhibits damage of various components and devices by opening when the discharge pressure of the electric oil pump 60 exceeds a predetermined value. The discharge pressure decreases to or below the predetermined value accordingly. As illustrated in FIG. 3, the relief valve 90 includes a housing 90*c*, a ball 90*a*, and a spring 90*b*. The ball 90*a* and the spring 90*b* are accommodated within the housing 90*c*. An opening portion of the housing 90*c* is screwed by a bolt. The ball 90*a* is arranged to make contact with a valve portion 90*d* formed within the housing 90*c*.

The spring 90*b* including a predetermined load is arranged and compressed between the ball 90*a* and the bolt to bias the ball 90*a* to the valve portion 90*d*. Accordingly, the inside of the housing 90*c* and a relief oil passage 91 are disconnected from each other. The relief oil passage 91 is branched from the first pressurized chamber oil passage 111.

The operation of the clutch control system 80 will be explained below. A case where the vehicle is driven in a state where the clutch portion 8 of the clutch apparatus 40 is in the disconnected state, i.e., the vehicle is driven only by the electric motor 20, for example, will be explained. At this time, the electric oil pump 60 of the clutch control system 80 is controlled to operate by a command of the ECU 70. The electric oil pump 60 suctions the hydraulic oil in the reservoir 72 to discharge from the discharge port 60*b*. At this time, the control valve 51 is controlled to close by the command of the ECU 70. Accordingly, the hydraulic oil discharged from the electric oil pump 60 is supplied at a predetermined level of the oil pressure Pa to the input port 76 of the switching valve 50, the first output port 106 and the controlled pressure port 108 of the regulator valve 100 via the oil passages 111, 113, and 114, respectively.

The oil pressure Pa of the hydraulic oil supplied to the controlled pressure port 108 of the regulator valve 100 is applied to the first pressure-receiving surface 102*h* of the valve element 102. Then, the valve element 102 is biased to move towards the second output port 109 depending on the magnitude of the oil pressure Pa against the biasing force of the coil spring 103. Accordingly, the oil pressure Pa is regulated to the first predetermined fluid pressure, In a case where the valve element 102 moves beyond the predetermined amount, the right end surface (in FIG. 3) of the cut groove 102*f* of the valve element 102 enters the drain port 107 so that the cut groove 102*f* (the first output port 106) and the drain port 107 are connected to each other.

The opening area formed between the cut groove 102*f* (the first output port 106) and the drain port 107 is adjustable on a basis of the magnitude of the first predetermined fluid pressure applied to the first pressure-receiving surface 102*h* of the valve element 102. At this time, in a state where a constant voltage is applied to the electric oil pump 60, the oil pressure Pa at each of the oil passages 111, 113, and 114 decreases depending on the size of the opening area. According to the present embodiment, a spring force of the coil spring 103 is specified so that the opening area is inhibited from excessively opening in a case where only the first pressure-receiving surface 102*h* of the valve element 102 receives the oil pressure Pa.

As a result, in a case where only the first pressure-receiving surface 102*h* receives the oil pressure Pa, a small amount of hydraulic oil is discharged from the small opening area to the drain port 107 and is supplied as the drain lubricant to the clutch portion 8 via the conduit 62 and the penetration bore 86. The oil pressure Pa of each of the oil passages 111, 113, and 114 is regulated (to the first predetermined fluid pressure) accordingly. At this time, because the clutch portion 8 is in the disconnected state, a large amount of lubricant is not necessary and a small amount of lubricant is adequate. At this time, however, the volume of lubricant supplied to the clutch portion 8 may be appropriately specified. For example, in the disconnected state of the clutch portion 8, no lubricant may be supplied to the clutch portion 8.

At this time, in the switching valve 50, the hydraulic oil regulated to the first predetermined fluid pressure and supplied to the input port 76 is applied to the side surface of the flange portion 74*b* and the second axial end surface of the switching valve element 74 serving as the third pressure-receiving surface S3. The switching valve element 74 is biased to the switch port 77 by the biasing force −F1. At this time, the hydraulic oil is not supplied to the switch port 77. Therefore, the biasing force biasing the switching valve element 74 to the input port 76 is only constituted by the biasing force F2 of the compression coil spring 75. According to the present embodiment, it is specified that the biasing force −F1 is greater than the biasing force F2. As a result, the switching valve element 74 moves towards the switch port 77, i.e., towards the second position P2, to thereby enlarge the void 85. The input port 76 and the connection port 78 are connected to each other and the hydraulic oil at the first predetermined fluid pressure is supplied to the pressurized chamber 46.

Accordingly, the hydraulic oil at the first predetermined fluid pressure supplied to the pressurized chamber 46 presses the piston member 44 against the canceller chamber 52 so that the clutch portion 8 is brought to the disconnected state. The first predetermined fluid pressure is specified and adjusted to an appropriate value so as to bring the clutch portion 8 in the disconnected state by the operation of the regulator valve 100.

Next, a case where the clutch portion 8 is changed from the disconnected state to the connected state, i.e., the vehicle is driven by both the electric motor 20 and the engine 10, for example, will be explained. At this time, the electric oil pump 60 is continuously operated. The control valve 51 is controlled to open by the command of the ECU 70.

Accordingly, the hydraulic oil discharged from the electric oil pump 60 is supplied to the switch port 77 of the switching valve 50, the second output port 109 of the regulator valve 100, and the canceller chamber 52 of the clutch apparatus 40 by flowing through the oil passages 118, 117, and 116. In the same way as the disconnected state of the clutch portion 8, the hydraulic oil is supplied to the input port 76 of the switching valve 50, the first output port 106 and the controlled pressure port 108 of the regulator valve 100 by flowing through the oil passages 111, 113, and 114.

The oil pressure Pa of the hydraulic oil supplied to the controlled pressure port 108 and the second output port 109 of the regulator valve 100 is applied to the first pressure-receiving surface 102h and the second pressure-receiving surface 102i of the valve element 102. Thus, the greater biasing force (F3'+F4) than the biasing force F3 that is generated in the closed state of the control valve 5115 applied to the valve element 102. At this time, the biasing force F3' is generated when the second predetermined fluid pressure is applied to the first pressure-receiving surface 102h as mentioned above. Thus, the biasing force F3' is smaller by a difference between the first predetermined fluid pressure and the second predetermined fluid pressure than the biasing force F3 that is generated when the first predetermined fluid pressure is applied to the first pressure-receiving surface 102h. Nevertheless, according to the present embodiment, the relationship (F3'+F4)>F3 is specified and therefore the valve element 102 further greatly moves rightward in FIG. 3 against the biasing force F5 of the coil spring 103.

Because the valve element 102 further moves beyond the predetermined amount, the right end surface of the cut groove 102f of the valve element 102 greatly enters the drain port 107 so that the opening area between the cut groove 102f (the first output port 106) and the drain port 107 is controlled to greatly open. The large amount of hydraulic oil is discharged via the large opening area to the drain port 107 and is supplied as the drain lubricant to the clutch portion 8 from the drain port 107 by flowing through the lubrication flow passage 57 constituted by the conduit 62 and the penetration bore 86, for example.

At this time, the clutch portion 8 is shifting to the connected state, which will be explained later, so as to be effectively lubricated and cooled by the large amount of hydraulic oil. Thus, the friction plates 42 and the separate plates 43 of the clutch portion 8 are restrained from producing heat or wearing by friction. Because the large amount of lubricant is sent out through the large opening area between the cut groove 102f (i.e., the first output port 106 connected to the cut groove 102f) and the drain port 107, the oil pressure Pa decreases to a small value from the second predetermined fluid pressure. Accordingly, in a case where the oil pressure Pa decreases from the second predetermined fluid pressure, the discharge pressure of the electric oil pump 60 also decreases.

Generally, a discharge pressure and a discharge amount of the electric oil pump 60 driven by the constant voltage are inversely proportional to each other. Thus, the decrease of discharge pressure results in a further greater discharge amount of hydraulic oil by the electric oil pump 60. The further greater amount of lubricant may be supplied to the clutch portion 8 accordingly.

At this time, the hydraulic oil at the second predetermined fluid pressure is supplied to the switch port 77 and the input port 76. The second predetermined fluid pressure is received by the side surfaces of the flange portions 74a, 74b, and the first and second axial end surfaces of the switching valve element 74, i.e., the third and fourth pressure-receiving surfaces S3 and S4, so that the biasing forces (F1 and −F1) applied to the switching valve element 74 are cancelled out. Then, the switching valve element 74 moves towards the first position P1 (the discharge mode) by the biasing force F2 of the compression coil spring 75 to be stopped. The connection passage 121 to the pressurized chamber 46 is blocked accordingly. In addition, because the switching valve element 74 moves to the first position P1, the connection port 78 and the switching valve drain port 79 are connected to each other via the void 84. The pressurized chamber 46 is thus connected to the reservoir 72 so that the hydraulic oil within the pressurized chamber 46 may be discharged to the reservoir 72.

At the same time, the hydraulic oil at the second predetermined fluid pressure is supplied to the canceller chamber 52 by flowing through the oil passage 116. Because the aperture 116a including the predetermined aperture diameter is provided at the oil passage 116, the hydraulic oil sent out from the discharge port 51b of the control valve 51 is inhibited from excessively flowing to the canceller chamber 52. The supply volume of hydraulic oil to the respective ports 77, 76, and 106, the controlled pressure port 108, and the second output port 109, for example, is ensured accordingly. Further, the supply volume of hydraulic oil to the clutch portion 8 is ensured. The pressure of hydraulic oil supplied to the canceller chamber 52 is substantially reduced to an atmospheric pressure by the operation of the aperture 116a.

In the aforementioned state, the compression coil spring 45 of the clutch apparatus 40 biases the piston member 44 forward. The piston member 44 then pushes the friction plates 42 and the separate plates 43 forming the clutch portion 8 at the pressing portion 44a by a predetermined load. At this time, the hydraulic oil within the pressurized chamber 46 that is decreasing is discharged to the reservoir 72 by flowing through the second pressurized chamber oil passage 112, the connection port 78, the void 84, and the switching valve drain port 79 of the switching valve 50.

At this time, a centrifugal oil pressure serving as a centrifugal fluid pressure generated by the hydraulic oil that remains within the pressurized chamber 46 is cancelled out by a centrifugal oil pressure generated by the hydraulic oil supplied to the canceller chamber 52. The clutch portion 8 is effectively held in the connected state accordingly. At this time, the large amount of hydraulic oil is supplied to the clutch portion 8 as the lubricant from the drain port 107 of the regulator valve 100 through the lubrication flow passage 57. Accordingly, the friction plates 42 and the separate plates 43 of the clutch portion 8 are effectively refrained from producing heat or wearing by friction.

According to the clutch control system 80 of the aforementioned embodiment, the regulator valve 100 switched to the first mode or the second mode discharges a portion of the hydraulic oil of which the oil pressure is regulated as the drain lubricant supplied to the clutch portion 8. Accordingly, the portion of the hydraulic oil of which the oil pressure is regulated to connect or disconnect the clutch portion 8 is discharged from the regulator valve 100 and is supplied to the clutch portion 8 for cooling and lubricating the clutch portion 8. As a result, the clutch portion 8 is effectively cooled and lubricated, and a small-sized electric oil pump (the electric oil pump 60) may sufficiently cool and lubricate the clutch portion 8. Because the clutch portion 8 is effectively cooled and lubricated, the clutch portion 8 may actively connect the input shaft 41 and the drum 26 even when rotational speeds of the input shaft 41 and the drum 26 are different from each other. A time period for connecting the input shaft 41 and the drum 26 may be effectively reduced.

By the control of the control valve 51, the regulator valve 100 is selectively switched between the first mode in which the hydraulic oil is regulated to the first predetermined fluid pressure and the second mode in which the hydraulic oil is regulated to the second predetermined fluid pressure. In addition, the switching valve 50 is selectively switched between the supply mode in which the hydraulic oil is supplied to the pressurized chamber 46 and the discharge mode in which the hydraulic oil is discharged from the pressurized chamber 46. The switching between the first mode and the second mode of the regulator valve 100, and switching between the supply mode and the discharge mode of the switching valve 50 are performed by the single control valve 51 at the same time, which decreases a control load.

In addition, according to the aforementioned embodiment, the valve element 102 moves so that the first predetermined fluid pressure received by the first pressure-receiving surface 102*h* of the valve element 102 is balanced relative to the biasing force of the coil spring 103 applied to the valve element 102 in the first mode, or so that the second predetermined fluid pressure received by the first and second pressure-receiving surfaces 102*h* and 102*i* of the valve element 102 is balanced relative to the biasing force of the coil spring 103 applied to the valve element 102 in the second mode. Accordingly, the first output port 106 and the drain port 107 are connected to each other to supply the lubricant to the clutch portion 8. The clutch portion 8 is cooled and lubricated accordingly. The regulator valve 100 that supplies the drain lubricant to the clutch portion 8 by a simple structure and a reduced cost may be achieved.

Further, according to the aforementioned embodiment, in a case where the hydraulic oil at the first predetermined fluid pressure is supplied to the input port 76 of the switching valve 50, the switching valve element 74 is biased to move by the first predetermined fluid pressure. The switching valve 50 is thus brought to the supply mode in which the input port 76 and the connection port 78 are connected to each other. The hydraulic oil at the first predetermined fluid pressure is supplied to the pressurized chamber 46 to bring the clutch portion 8 to the disconnected state. When the hydraulic oil at the second predetermined fluid pressure is supplied to the switch port 77 and the input port 76 of the switching valve 50, the biasing forces generated by the hydraulic oil supplied to the switch port 77 and the input port 76 are cancelled out, i.e., the second predetermined fluid pressure received by the third pressure-receiving surface S3 and the second predetermined fluid pressure received by the fourth pressure-receiving surface S4 are cancelled out. The switching valve element 74 is biased only by the biasing force of the compression coil spring 75. Thus, the switching valve element 74 moves to disconnect the input port 76 from the connection port 78, which results in the discharge mode of the switching valve 50 in which the connection port 78 is connected to the switching valve drain port 79. Accordingly, the supply of the hydraulic oil to the pressurized chamber 46 is interrupted and the pressurized chamber 46 is switched to connect to the reservoir 72, which results in a release of the pressurized chamber 46 to atmospheric air. Consequently, the switching valve 50 that Is switchable between the supply mode in which the hydraulic oil including the first predetermined fluid pressure is supplied to the pressurized chamber 46 and the discharge mode in which the hydraulic oil is discharged from the pressurized chamber 46 may be obtained by a simple structure and a reduced cost.

Furthermore, according to the present embodiment, the control valve 51 that simultaneously performs switching of the regulator valve 100 between the first mode and the second mode, and switching of the switching valve 50 between the supply mode and the discharge mode is constituted by an inexpensive on-off valve, which may contribute to a reduced cost.

Furthermore, according to the present embodiment, the lubrication flow passage 57 is formed between the regulator valve 100 and the clutch portion 8. Thus, the lubricant is effectively supplied to the clutch portion 8, which improves cooling and lubrication of the clutch portion 8.

Furthermore, according to the present embodiment, the control valve 51 is an electromagnetic valve of a normally-open type connected to the canceller chamber 52. In addition, the switching valve 50 is a mechanical valve connected to the pressurized chamber 46 and is controlled to switch to the opposite open/close state from the open/close state of the control valve 51 by receiving the hydraulic oil from the control valve 51. Because the control valve 51 is the normally-open electromagnetic valve, the control valve 51 is in the open state when broken down and the switching valve 50 is brought to the closed state. Thus, when the control valve 51 is broken down, the hydraulic oil supplied from the electric oil pump 60 is supplied to the canceller chamber 52 and is interrupted to be supplied to the pressurized chamber 46. The clutch portion 8 is held in the connected state, which may achieve a continuous driving of the vehicle by the engine 10. Reliability of the vehicle driving is improved accordingly.

As mentioned above, the control valve 51 is the normally open electromagnetic valve while the switching valve 50 is the mechanically operated valve that is operated to the opposite open/close state relative to the open/close state of the control valve 51 by the hydraulic oil sent from the control valve 51. Alternatively, the control valve 51 may be a normally closed electromagnetic valve to control the open/close state of the switching valve 50 to the opposite state from the control valve 51.

The switching valve 50 is not limited to the aforementioned structure of the embodiment. As long as the switching valve 50 is connected between the first output port 106 and the pressurized chamber 46 and is switchable, because of the hydraulic oil sent from the control valve 51, between the supply mode in which the hydraulic oil regulated to the first predetermined fluid pressure is supplied to the pressurized chamber 46 and the discharge mode in which the pressurized chamber 46 is released (connected) to the reservoir 72, the switching valve 50 may include any configurations.

In addition, the control valve 51 may include any configuration as long as the control valve 51 performs on-off control. Further, the control valve 51 may be manually operated.

According to the aforementioned embodiment, a portion lubricated by the lubricant is the clutch portion 8. Alternatively, each sliding portion instead of the clutch portion 8 may be lubricated by the lubricant.

According to the aforementioned embodiment, the regulator valve 100 includes, in the housing 101, the valve element 102, the controlled pressure port 108 connected to the discharge port 60b of the electric oil pump 60 to apply the first predetermined fluid pressure or the second predetermined fluid pressure to the first pressure-receiving surface 102h of the valve element 102, the drain port 107 connected to the first output port 106 to supply the drain lubricant to the clutch portion 8 in a case where the first predetermined fluid pressure or the second predetermined fluid pressure is applied to the first pressure-receiving surface 102h to move the valve element 102, and the coil spring 103 biasing the valve element 102 in a direction opposite from a direction in which the first predetermined fluid pressure or the second predetermined fluid pressure is applied to the first pressure-receiving surface 102h. The first output port 106 is connected to the discharge port 60b of the electric oil pump 60 and the second output port 109 is connected to the canceller chamber 52 via the aperture 116a and to the discharge port 51b of the control valve 51, the second output port 109 applying the second predetermined fluid pressure to the second pressure-receiving surface 102i formed in the same direction as the first pressure-receiving surface 102h. The valve element 102 moves in a state where the first predetermined fluid pressure received by the first pressure-receiving surface 102h of the valve element 102 is balanced relative to the biasing force of the coil spring 103 in the first mode, and the second predetermined fluid pressure received by the first pressure-receiving surface 102h and the second pressure-receiving surface 102i of the valve element 102 is balanced relative to the biasing force of the coil spring 103 in the second mode, the first output port 106 and the drain port 107 being connected to supply a portion of the hydraulic oil to the clutch portion 8 as the drain lubricant.

In addition, according to the aforementioned embodiment, the switching valve 50 includes, in the valve housing 73, the switching valve element 74, the input port 76 connected to the first output port 106 to apply the first predetermined fluid pressure or the second predetermined fluid pressure to the third pressure-receiving surface S3 of the switching valve element 74, the switch port 77 applying the second predetermine fluid pressure to the fourth pressure-receiving surface S4 that includes the same area as the third pressure-receiving surface S3 and that is formed in an opposite direction from the third pressure-receiving surface S3, the switch port 77 being connected to the discharge port 51b of the control valve 51, the connection port 78 connected to the pressurized chamber 46, the switching valve drain port 79 connected to the reservoir 72, and the compression coil spring 75 biasing the switching valve element 74 in a direction opposite from a direction in which the first predetermined fluid pressure or the second predetermined fluid pressure is applied to bias the third pressure receiving surface S3. In the supply mode, the third pressure-receiving surface S3 of the switching valve element 74 receives the first predetermined fluid pressure so that the switching valve element 74 moves against the biasing force F2 of the compression coil spring 75, which results in a connection between the input port 76 and the connection port 78 to supply the hydraulic oil at the first predetermined fluid pressure to the pressurized chamber 46. In the discharge mode, the second predetermined fluid pressure received by the third pressure-receiving surface S3 and the second predetermined fluid pressure received by the fourth pressure-receiving surface S4 are cancelled out, and the switching valve element 74 moves by the biasing force F2 of the compression coil spring 75, which results in a connection between the connection port 78 and the switching valve drain port 79 to connect the pressurized chamber 46 to the reservoir 72.

Further, according to the aforementioned embodiment, the control valve 51 is an on-off valve.

The principles, preferred embodiment and mode of operation of the present invention have been described in the foregoing specification. However, the invention which is intended to be protected is not to be construed as limited to the particular embodiments disclosed, Further, the embodiments described herein are to be regarded as illustrative rather than restrictive, Variations and changes may be made by others, and equivalents employed, without departing from the spirit of the present invention, Accordingly, it is expressly intended that all such variations, changes and equivalents which fall within the spirit and scope of the present invention as defined in the claims, be embraced thereby.

The invention claimed is:

1. A clutch control system of a clutch apparatus for a vehicle, the clutch apparatus being a normally-closed type and including a clutch portion selectively connecting and disconnecting an input shaft that is rotatably connected to an engine and an output shaft that is rotatably connected to an electric motor, a compression spring biasing a piston member in a direction in which the clutch portion is connected, a pressurized chamber causing the piston member to move in a direction opposite from a biasing direction of the compression spring to disconnect the clutch portion in a state to be supplied with a hydraulic fluid including a predetermined pressure, and a canceller chamber generating a fluid pressure for cancelling a centrifugal fluid pressure that is generated at the hydraulic fluid remaining at the pressurized chamber by being supplied with a hydraulic fluid in a state where the clutch portion is connected, the clutch control system comprising:

an electric oil pump supplying the hydraulic fluid to the pressurized chamber, the canceller chamber, and the clutch portion;

a regulator valve being switchable between a first mode in which a fluid pressure of the hydraulic fluid supplied from a first output port to the pressurized chamber is regulated to a first predetermined fluid pressure and a second mode in which the fluid pressure of the hydraulic fluid supplied from a second output port to the canceller chamber is regulated to a second predetermined fluid pressure, the regulator valve discharging a portion of the hydraulic fluid at the first predetermined fluid pressure in the first mode or at the second predetermined fluid pressure in the second mode as a drain lubricant to be supplied to the clutch portion;

a switching valve connected between the first output port and the pressurized chamber and being switchable between a supply mode in which the hydraulic fluid regulated to the first predetermined fluid pressure is supplied to the pressurized chamber and a discharge mode in which the pressurized chamber is connected to a reservoir; and a control valve connected to the electric oil pump, the regulator valve, the switching valve, and the canceller chamber, the control valve controlling the regulator valve to be switched between the first mode and the second mode and controlling the switching valve to be switched between the supply mode and the discharge mode.

2. The clutch control system according to claim 1, wherein the regulator valve includes in a housing a valve element, a controlled pressure port connected to a discharge port of the electric oil pump to apply the first predetermined fluid pressure or the second predetermined fluid pressure to a first pressure-receiving surface of the valve element, a drain port connected to the first output port to supply the drain lubricant to the clutch portion in a case where the first predetermined fluid pressure or the second predetermined fluid pressure is applied to the first pressure-receiving surface to move the valve element, and an elastic member biasing the valve element in a direction opposite from a direction in which the first predetermined fluid pressure or the second predetermined fluid pressure is applied to the first pressure-receiving surface, wherein the first output port is connected to the discharge port of the electric oil pump and the second output port is connected to the canceller chamber via an aperture and to a discharge port of the control valve, the second output port applying the second predetermined fluid pressure to a second pressure-receiving surface formed in the same direction as the first pressure-receiving surface, and wherein the valve element moves in a state where the first predetermined fluid pressure received by the first pressure-receiving surface of the valve element is balanced relative to a biasing force of the elastic member in the first mode, and the second predetermined fluid pressure received by the first pressure-receiving surface and the second pressure-receiving surface of the valve element is balanced relative to the biasing force of the elastic member in the second mode, the first output port and the drain port being connected to supply a portion of the hydraulic fluid to the clutch portion as the drain lubricant.

3. The clutch control system according to claim 1, wherein the switching valve includes in a valve housing a switching valve element, an input port connected to the first output port to apply the first predetermined fluid pressure or the second predetermined fluid pressure to a third pressure-receiving surface of the switching valve element, a switch port applying the second predetermine fluid pressure to a fourth pressure-receiving surface that includes the same area as the third pressure-receiving surface and that is formed in an opposite direction from the third pressure-receiving surface, the switch port being connected to the discharge port of the control valve, a connection port connected to the pressurized chamber, a switching valve drain port connected to the reservoir, and a switching valve elastic member biasing the switching valve element in a direction opposite from a direction in which the first predetermined fluid pressure or the second predetermined fluid pressure is applied to bias the third pressure receiving surface, wherein in the supply mode the third pressure-receiving surface of the switching valve element receives the first predetermined fluid pressure so that the switching valve element moves against a biasing force of the switching valve elastic member, which results in a connection between the input port and the connection port to supply the hydraulic fluid at the first predetermined fluid pressure to the pressurized chamber, and wherein in the discharge mode the second predetermined fluid pressure received by the third pressure-receiving surface and the second predetermined fluid pressure received by the fourth pressure-receiving surface are cancelled out, and the switching valve element moves by the biasing force of the switching valve elastic member, which results in a connection between the connection port and the switching valve drain port to connect the pressurized chamber to the reservoir.

4. The clutch control system according to claim 1, wherein the control valve is an on-off valve.

* * * * *